C. W. KING.
FASTENING DEVICE FOR THE CLOSURES OF BURIAL VAULTS.
APPLICATION FILED SEPT. 20, 1917.
1,276,932.
Patented Aug. 27, 1918.
2 SHEETS—SHEET 1.
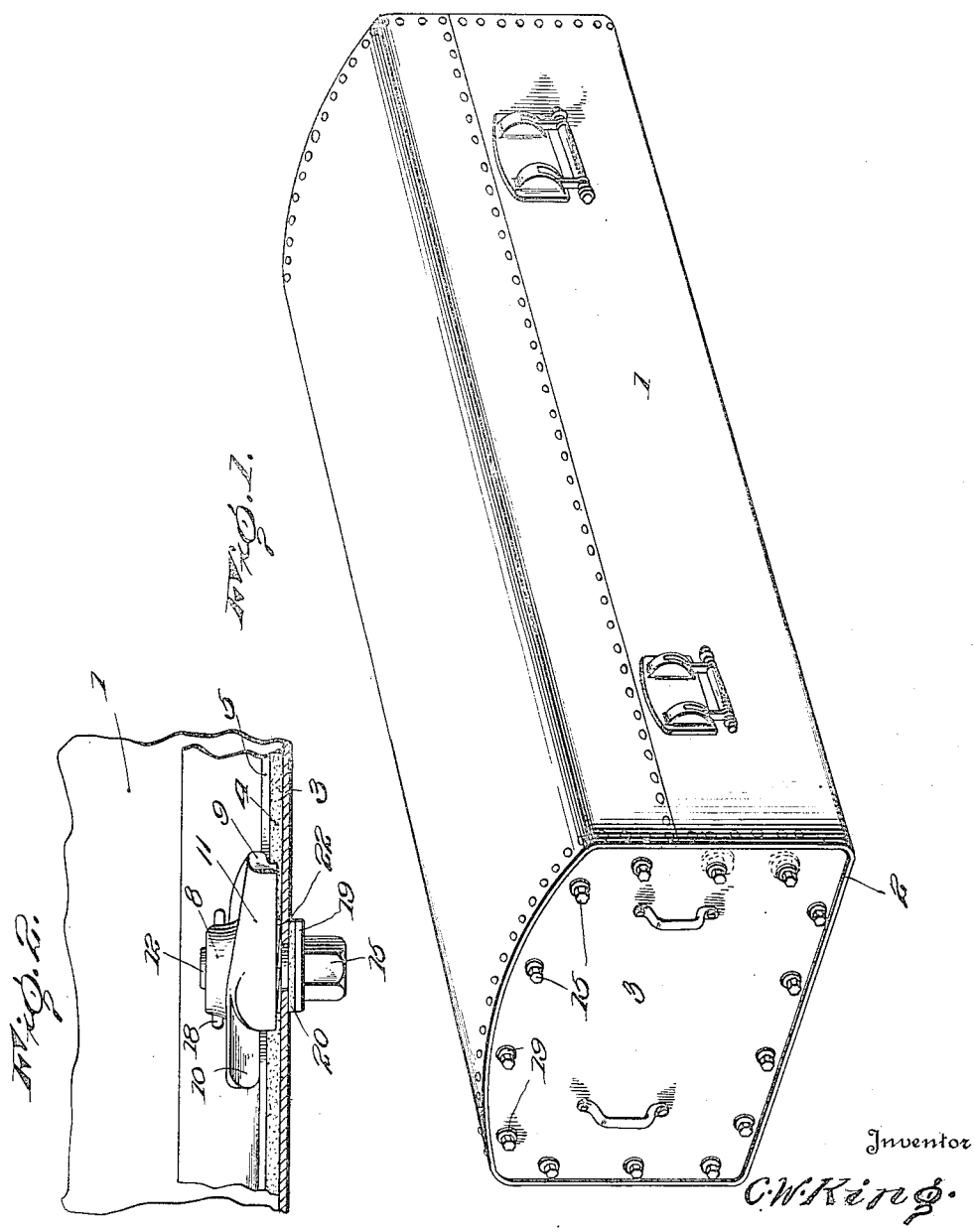
Inventor
C.W.King.
By
Attorneys.

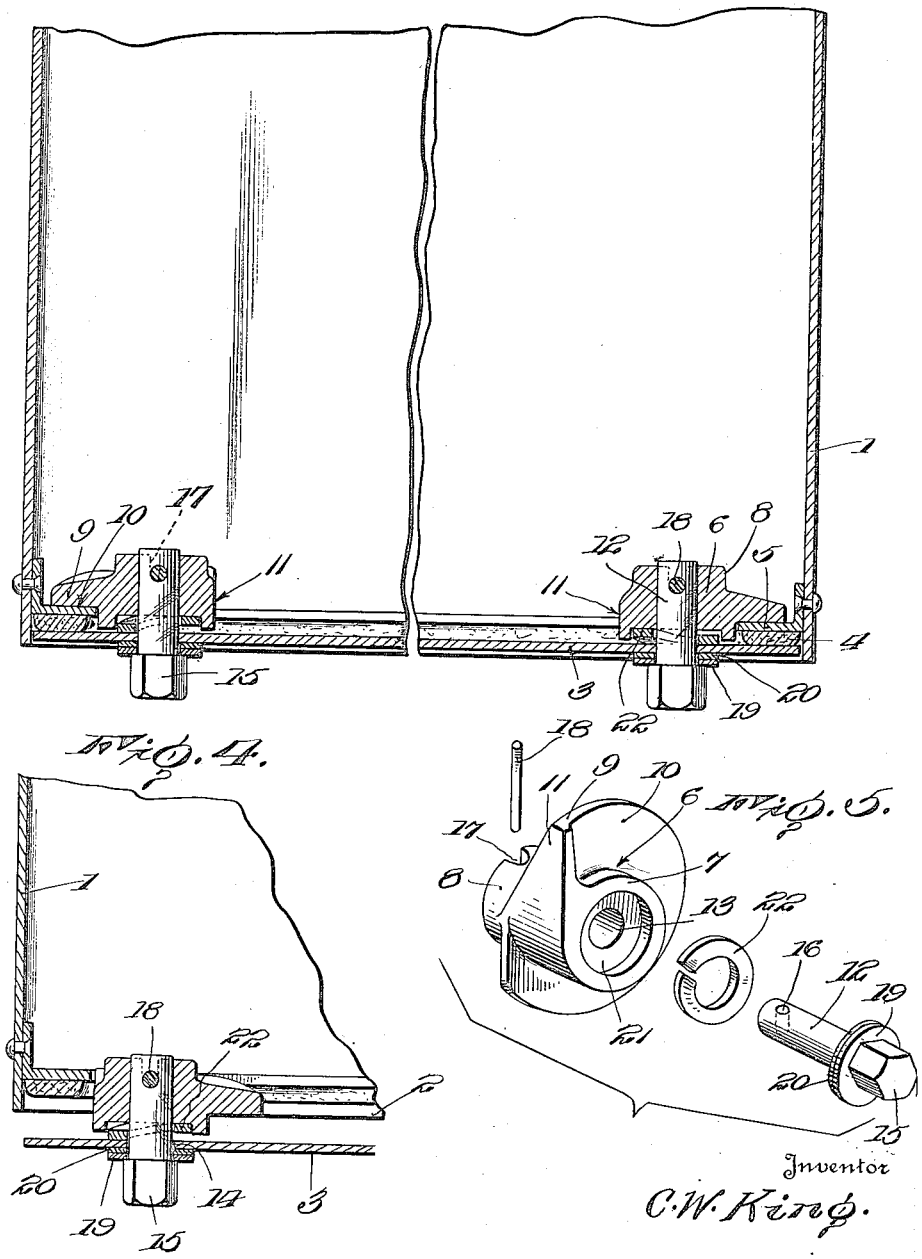

UNITED STATES PATENT OFFICE.

CLARENCE W. KING, OF GALION, OHIO, ASSIGNOR TO THE NATIONAL GRAVE VAULT CO., OF GALION, OHIO.

FASTENING DEVICE FOR THE CLOSURES OF BURIAL-VAULTS.

1,276,932.  Specification of Letters Patent.  Patented Aug. 27, 1918.

Application filed September 20, 1917. Serial No. 192,359.

*To all whom it may concern:*

Be it known that I, CLARENCE W. KING, a citizen of the United States, residing at Galion, in the county of Crawford and State of Ohio, have invented certain new and useful Improvements in Fastening Devices for the Closures of Burial-Vaults, of which the following is a specification.

This invention relates to burial vaults and more particularly to an improvement in the sealing devices for the closures thereof. Heretofore the closures of metallic burial vaults have been sealed either by the employment of a number of bolts and nuts or various types of quick closing sealing means have been employed consisting usually of sliding bolts designed to be either individually or simultaneously shot into place. Where threaded bolts and nuts are employed considerable time is required in first unthreading the nuts, and then removing the lid, next placing the lid in position, and then individually placing the nuts upon the bolts and tightening the same. Furthermore, there is likelihood of one or more of the nuts being dropped which results in further loss of time. These disadvantages are overcome in sealing devices of the quick closing type employing sliding bolts, but in this latter instance the structure is usually not such as to insure of the closure being firmly drawn into place so that it cannot be as securely closed as by the use of threaded bolts. The present invention, therefore, has as its primary aim to provide a sealing device for the closures of burial vaults which will overcome the disadvantages presented by the sealing devices above briefly described and which will, at the same time, possess all of the advantages thereof, the device of the invention being capable of rapid manipulation to seal or bind the closure in place and at the same time being so constructed as to exert great drawing force upon the closure thereby insuring of its being seated firmly in place in an air and water-tight manner.

Another aim of the invention is to provide a sealing device of the class mentioned of such construction that a considerable number of the devices may be arranged in close proximity to each other about the edge of the vault closure so that great drawing force may be exerted along all portions of the edge of the closure as effectually as though a great number of threaded bolts were employed, the sealing devices, being, however, as before stated, so constructed that while they are individually adjustable to seal the closure in place, this adjustment may be very rapidly accomplished.

Another aim of the invention is to so construct the sealing devices that they may all be so positioned as not to in any way interfere with the placing of the closure in position and its removal at any time prior to the final sealing of the vault.

In the accompanying drawings:

Figure 1 is a perspective view illustrating the embodiment of the invention in a burial vault having a closure at one end thereof;

Fig. 2 is a top plan view of the sealing device embodying the present invention, applied, the closure being shown in horizontal section;

Fig. 3 is a horizontal sectional view through the receiving end of the vault and through the sealing devices embodying the present invention, the devices being in position to seal the closure for the vault;

Fig. 4 is a view similar to Fig. 3 but illustrating the sealing device adjusted to permit of free disposal and removal of the closure within the open end of the vault;

Fig. 5 is a perspective view of one of the sealing devices, the parts thereof being disassembled.

In the drawings, the numeral 1 indicates in general the body of a metallic burial vault, which body is open at one end, as indicated by the numeral 2, it being understood that the casket is to be introduced into the vault through this end and that the said end is to be sealed by a closure, which closure is in the nature of a plate, indicated in general by the numeral 3. While the drawings illustrate the invention embodied in a burial vault of that type having its closure located at one end, it will be understood that the principles of the invention may equally as well find embodiment in a vault having an open top provided with a lid to be sealed. The closure plate 3 is designed to seat at the edges of its inner face against a rubber or other suitable yieldable packing strip or gasket 4 disposed against and fixed to a flange 5, which flange is continuous and extends around the interior of the vault at the open end thereof, the flange projecting inwardly at right angles from the walls of the vault and being riveted or otherwise secured to said walls. The sealing devices embodying the present invention are arranged at suitable intervals about the marginal portion of the closure plate 3 and are designed to coact with the flange 5 to lock and seal the said plate in closed position.

Each of the sealing devices embodying the invention includes in its structure a cam indicated in general by the numeral 6, the cam comprising a hub, one end portion of which is indicated by the numeral 7 and the other end portion by the numeral 8, these portions projecting beyond opposite sides of the body of the cam which is indicated by the numeral 9. The body of the cam has a spiral cam face 10 and at one side of the hub, the body is flattened, as at 11, so that its said side will be substantially tangential to the circumferential surface of the said hub. The purpose of thus forming the cam body will presently be fully explained. The cams 6 of the several sealing devices employed are located upon the inner face of the closure 3 so that their cam faces 10 may ride against the flange 5, as clearly shown in Figs. 2 and 3 of the drawings, and in order that the cam of each device may be rotatably adjusted to attain the desired results, a stem 12 is fitted through a bore 13 formed axially within the hub of the cam and rotatably through an opening 14 formed in the closure plate 3. At its outer end this stem is provided with a polygonal head 15 to provide for the engagement of a wrench or like implement therewith and at its inner end the stem is formed with a transverse opening 16 designed to register with alined diametrically oppositely located notches 17 formed in the end face of the portion 8 of the hub of the cam, a pin 18 being driven through the opening 16 with its end portions projecting into the said notches and the cam being in this manner connected for rotation with the stem. Fitted upon the stem 12 immediately inwardly of the head 15 is a washer 19 against which the said head bears, and a packing gasket 20 of asbestos, or any other suitable material, is fitted upon the stem between the washer 19 and the outer face of the closure plate 3 so as to prevent passage of air or moisture into the vault through the openings 14. In the end face of the portion 7 of the cam hub there is formed a recess 21 which surrounds the corresponding end of the bore 13 and disposed within this recess is a spiral spring washer 22 which bears against the bottom wall of the recess 21 and against the inner face of the closure plate 3 and serves, by reason of its frictional engagement with these parts, to prevent accidental rotation of the cam after it has been adjusted to a desired position.

It will be understood from the foregoing and from an inspection of Fig. 1 of the drawings, that a considerable number of the devices are to be arranged upon the closure plate 3 at the marginal portion thereof and when it is desired to seal the vault the cams are individually adjusted through the application of a wrench or the like to their heads 15 so that their flat sides 11 will be presented parallel to the edge of the portion of the flange 5 adjacent which they will be located as the closure plate is fitted into place. The cams when so adjusted will be held against accidental turning through gravity or otherwise, through the medium of the spiral spring washer 22 and as a consequence the closure plate may be disposed in position and removed without interference. Having been disposed in proper position with the edges of its inner face seating against the packing strip 4, the closure plate is locked in position and firmly sealed by individually adjusting the cams 6 so as to cause their cam faces to ride against the inner side of the flange 5. It will be understood that this adjustment may be quickly accomplished as it is only necessary to rotate each cam a small portion of one revolution, and as considerable leverage may be exerted in rotatably adjusting the cams to seal the closure plate in position, the cams may be caused to exert great drawing force against the closure plate.

Having thus described the invention, what is claimed as new is:

The combination with a burial vault having a receiving opening and a seating member located within the opening, and a closure for the opening, of a securing device for the closure including a stem rotatably fitted through the closure and provided at its outer end with means whereby it may be rotatably adjusted, a hub fitted upon the inner end of the stem and having a cam surface for engagement against the seating member, the said hub at its inner end being provided with notches and having a socket in its outer end, a pin fitted through the said stem and engaging at its ends in said notches whereby to connect the cam hub for rotation with the stem, a packing washer upon the stem seating against the outer face of the closure and sealing the opening therein through which the stem is rotatably fitted, and a spring fitting in the socket in the outer end of the hub and against the inner face of the closure and exerting an inward pull upon the said stem and also holding the cam hub in position for engagement of its notches with the ends of the said pin.

In testimony whereof I affix my signature.

CLARENCE W. KING. [L. S.]